United States Patent [19]

Heppenstall

[11] Patent Number: 5,271,829
[45] Date of Patent: Dec. 21, 1993

[54] TREATMENT SYSTEM FOR WASTE WATER

[76] Inventor: Richard J. Heppenstall, P.O. Box 353, Worcester, Mass. 01613

[21] Appl. No.: 776,610

[22] Filed: Oct. 10, 1991

[51] Int. Cl.⁵ .............................................. C02F 1/40
[52] U.S. Cl. .................... 210/127; 210/207; 210/209
[58] Field of Search ............... 210/207, 209, 218, 256, 210/538, 539, 127

[56] References Cited

U.S. PATENT DOCUMENTS

| | | | |
|---|---|---|---|
| 4,517,316 | 5/1985 | Mason | 264/41 |
| 4,670,149 | 6/1987 | Francis | 210/615 |
| 4,940,539 | 7/1990 | Weber | 210/632 |

Primary Examiner—Ivars Cintins
Attorney, Agent, or Firm—Blodgett & Blodgett

[57] ABSTRACT

A dispenser for introducing treatment material into an interceptor or grease trap for the purpose of digesting the grease or other hazardous materials which is separated from waste water which flows through the grease trap. The dispenser includes a housing having a compartment for holding a quantity of grease digesting material and a dispensing opening at the lower end of the compartment. A restricter is located at the dispensing opening for enabling the digesting material to pass from the dispensing opening to the grease and other materials to be treated in the chamber of the grease trap at a constant restrictive rate.

8 Claims, 3 Drawing Sheets

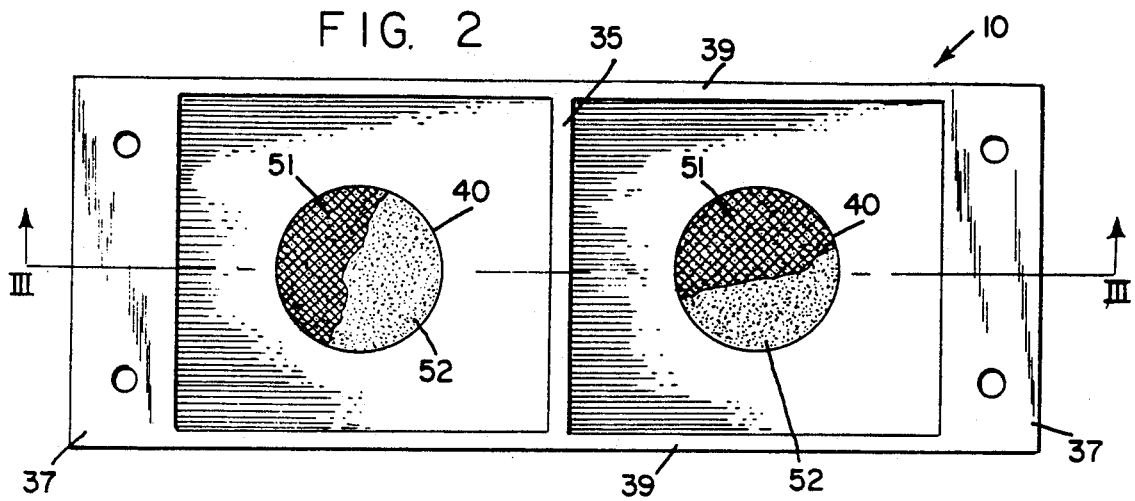
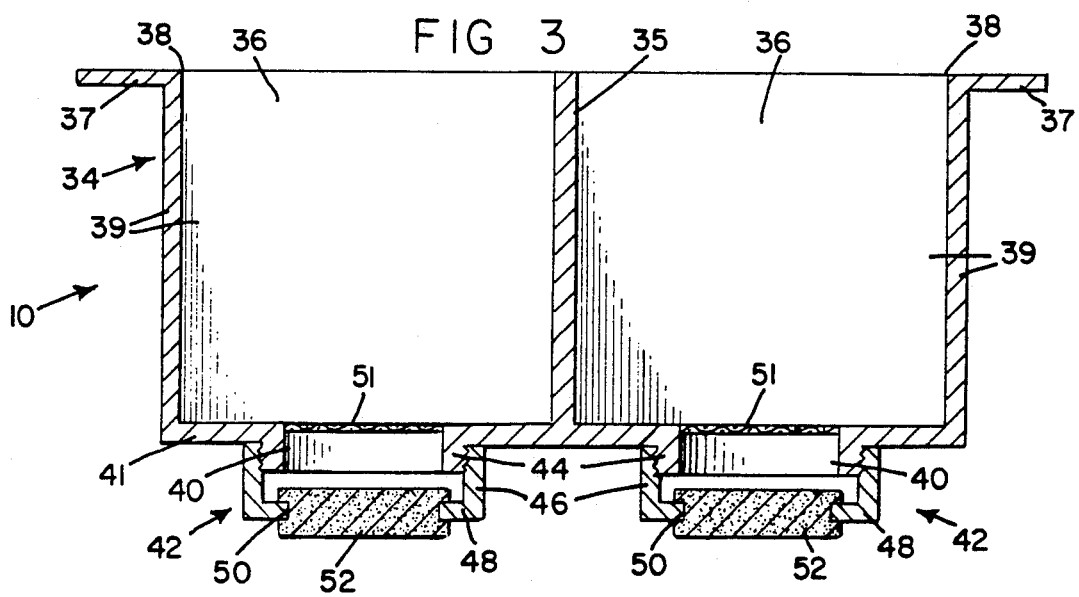
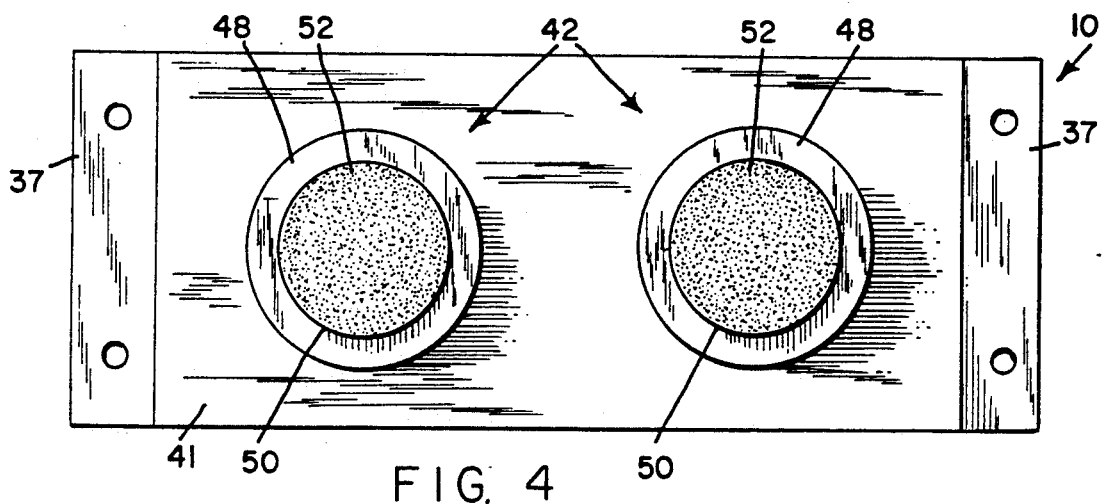

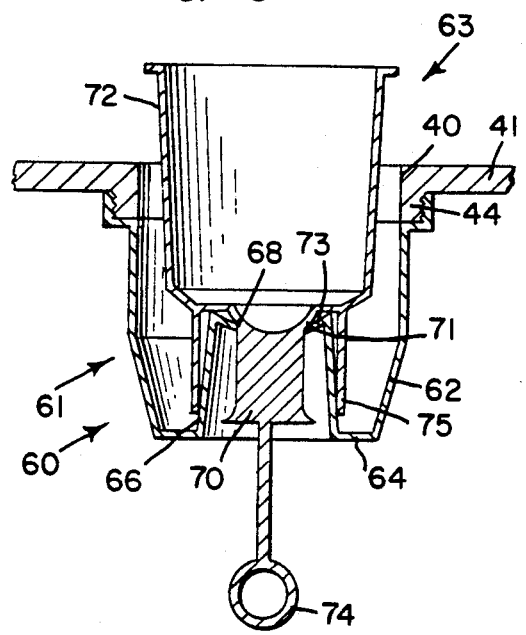
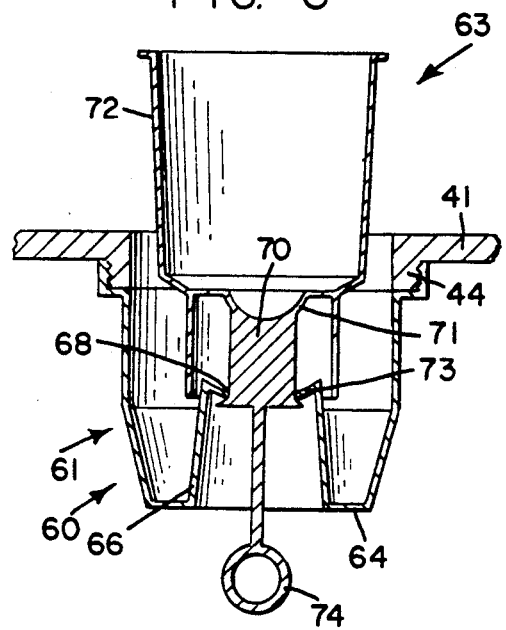
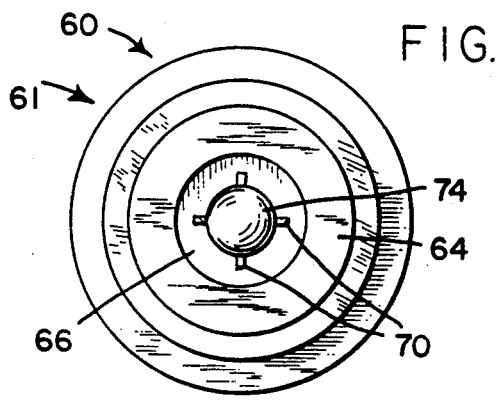

TREATMENT SYSTEM FOR WASTE WATER

BACKGROUND OF THE INVENTION

The present invention is generally directed to a treatment system for waste water which includes grease and other contaminants. The invention is particularly directed to a treatment system for grease traps or grease interceptros which are commonly used in the food service industry, as for example, restaurants, hotels, cafeterias.

Interceptors or grease traps are traditionally found attached to waste water systems in the food service industries. Their function is to trap and remove grease and other contaminants from the passing flow of waste water and store such contaminants for eventual removal from the trap. In addition to grease, other contaminants that are trapped by the interceptor or grease trap include fats, oil, gasoline, organic waste, hair and sediment. The grease trap is accessed periodically and the contaminants removed for eventual disposal. Grease and other contaminants build up very quickly. If they are not removed in a timely fashion, the ability of the trap to operate efficiently or at all, is seriously effected. When the trap is no longer functional, the contaminants will by-pass the trap and flow into areas which are intended to be kept free of these contaminants. The contaminants will either clog up the waste water system of the establishment in which the trap is employed or will flow into a municipal sewer system in violation of a local ordinance or state law.

Interceptors or grease traps are usually placed in close proximity to sinks and waste water lines. Available wall and floor space in this area is very limited. These areas are traditionally active locations with as much equipment as possible. Most grease traps require a relatively large compartment for storing grease and other contaminants, particularly if the food service facility operates on a large volume. This means that valuable floor or wall space is given up for the grease trap or the trap is situated in an awkward location making it difficult to clean.

The cleaning of grease traps is a dirty, smelly and generally unpleasant task. Because of this, there is an understandable reluctance on the part of the food service personnel to clean the traps. If the traps are not cleaned on a regular basis, they become saturated with grease and other contaminants so that they loose their grease separating capability. When this happens, grease laden waste water flows through the trap into the downstream plumbing which either causes clogging or discharge into the municipal sewerage system. If the trap is located in a high volume operation, it fills up with grease very quickly so that it is effective for only a small period of time between cleanings and the cleaning experience is even more unpleasant when it does occur. A clogged trap can also cause backup damage interruption in service, expensive emergency plumbing and drain cleaning charges. Another problem associated with grease traps is deciding who has to clean the traps or where to put the material once it has been removed. Grease trapped waste is classified as a hazardous material in many areas.

A variety of additive materials had been developed to extend the useful period between cleanings. The additive material causes the grease to break down or degrade into a less objectionable form. Some of the additives include enzymes, and other chemicals which help to "digest" the grease and other contaminants in the trap. Many of the chemicals help to encourage naturally occurring bacteria which helps to break down the grease. In other systems, bacteria is added to the grease trap in a treatment solution. A reservoir of the treatment solution is mounted on a wall or shelve near the trap along with a pump and timing mechanism. The solution is pumped into the trap periodically through tubing which extends from the pump to the trap. By digesting or by degrading the grease as it accumulates in the trap the useful period between cleanings is extended. However, the treatment system requires the utilization of wall or floor space which is at a premium in food service kitchen areas. In addition to representing objectionable clutter and unsightliness in the kitchen area, the equipment is also expensive and costly to run. These and other difficulties experienced with the prior art devices have been obviated by the present invention.

It is, therefore, a principle object of the invention to provide a treatment system for interceptors or grease traps which is compact and which is located within a conventional grease trap.

Another object of this invention is the provision of a treatment system for a grease trap which dispenses treatment material within the trap without the use of external power.

A further object of the present invention is the provision of a treatment system which dispenses a treatment solution into the trap at a restricted rate using gravity feed.

It is another object of the present invention to provide a treatment system for grease traps which dispenses a treatment solution at a rate which is controlled by usage of the trap.

A still further object of the invention is the provision of a treatment for a grease trap which is simple in construction, which is inexpensive, and which is capable of a long life of useful service with a minimum of maintenance.

With these and other objects in view, as will be apparent to those skilled in the art, the invention resides in the combination of parts set forth in the specification covered by the claims appended hereto.

SUMMARY OF THE INVENTION

In general, the invention consists of apparatus for treating waste water which contains contaminants including grease. The grease treating apparatus includes a dispenser which is mounted in a grease trap. The dispenser includes a housing having a compartment for containing a quantity of treatment solution and a dispensing opening at the lower end of the compartment. A restriction apparatus is located at the dispensing opening for enabling the treatment material to pass from the dispensing opening to the grease in the trap at a constant restricted rate.

BRIEF DESCRIPTION OF THE DRAWINGS

The character of the invention, however, may be best understood by reference to one of its structural forms, as illustrated by the accompanying drawings, in which:

FIG. 2 is a top plan view of the dispenser, FIG. 3 is a vertical cross-sectional view of the dispenser taken along the line III—III of FIG. 2, FIG. 4 is a bottom plan view of the dispenser, FIG. 5 is a fragmentary vertical cross-sectional view of a valve which represents a modification of the dispenser of the present invention and showing the valve in a closed position, FIG. 6 is a view similar to FIG. 5 showing the valve in the open position, and FIG. 7 is a bottom plan view of the valve of FIG. 5.

DESCRIPTION OF THE PREFERRED EMBODIMENT

Figure 1:
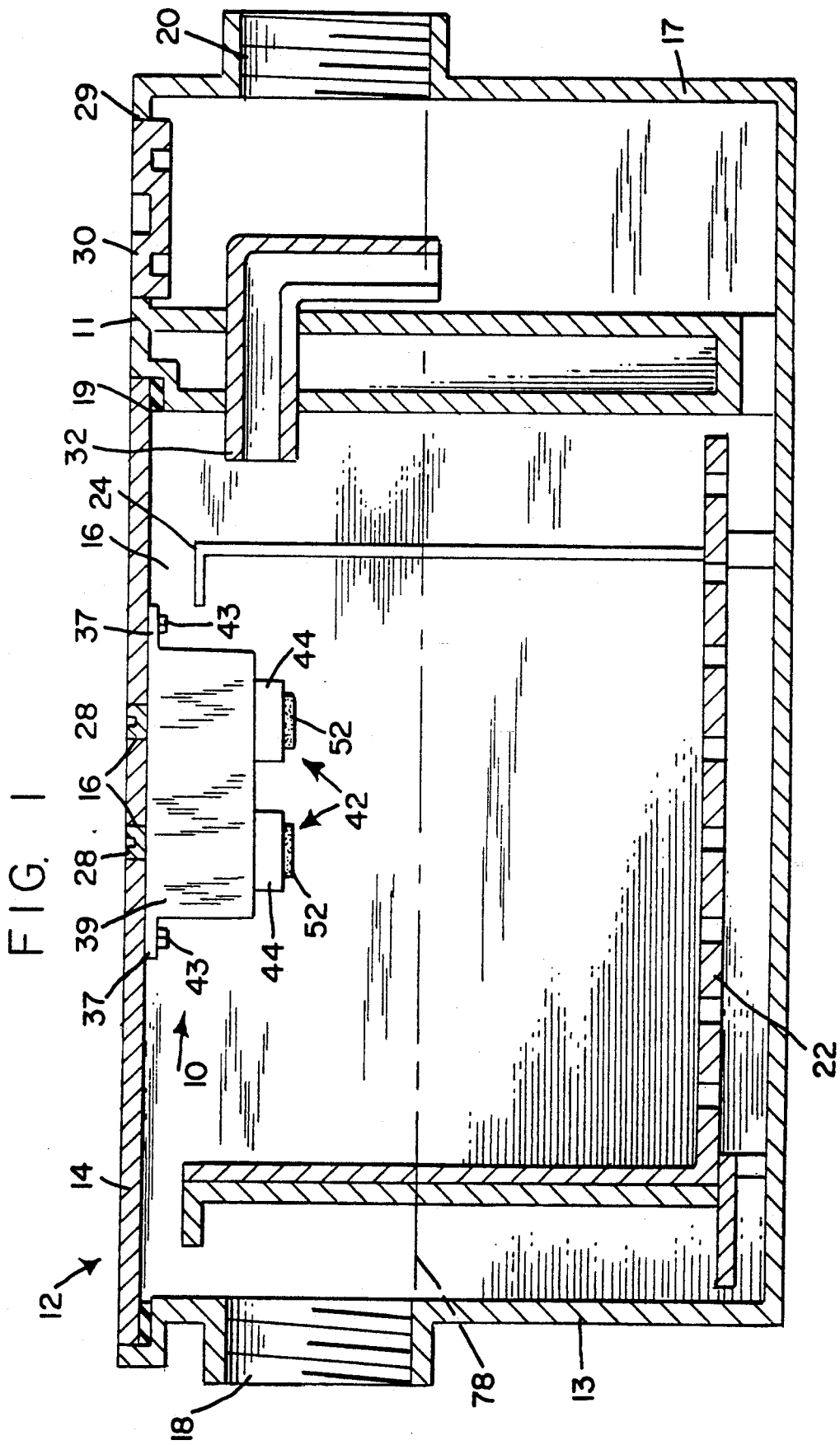
FIG. 1 is a front elevational view of a grease treatment dispenser embodying the principles of the present invention shown mounted within the confines of a conventional grease trap.

Referring first to FIG. 1, the dispenser of the present invention is generally indicated by the reference numeral 10, and is shown applied to a removable top cover 14 of a conventional grease trap 12. The grease trap 12 has a main chamber 16, an exit chamber 17 which is connected to the main chamber 16, an inlet opening 18, and an outlet opening 20. A removable lift-out sediment bucket 22 is located within the chamber 16 between the inlet and outlet openings 18 and 20, respectively. The trap has a top wall which has an access opening 19 which is closed by the top cover 14. The bucket 22 includes a lift-out handle 24 which enables the bucket to be removed from the chamber for cleaning. The wall 14 has a pair of treatment ports 16 which are closed by removable plugs 28. The housing 13 has an opening 29 in the top wall 11 adjacent the outlet opening 20 which is normally closed by a removable cleanout plug 30. The trap 12 also includes an air relief bypass 32 from the main chamber 16 to the exit chamber 17.

Referring to FIGS. 1-4, the dispenser 10 comprises a housing which is generally indicated by the reference numeral 34 and which comprises a plurality of vertical walls 39 and a bottom wall 41 which define an inner chamber which is divided into two compartments 36 by a vertical partition 35. Each compartment 36 has an access opening 38 and a dispensing opening 40. An annular flange 44 extends downwardly from each opening 40 and has external threads. A restricter mechanism 42 is mounted to the dispenser beneath each of the openings 40 and comprises an annular flange with internal threads for enabling the restricter to be threaded to the flange 44 and a bottom wall 48 which has a circular opening 50 for receiving a circular body 52 of porous material. The porous body 52 is preferably made of a porous rubber material which has through passageways between the upper surface of the body 52 to the lower surface of the body. This structure permits liquids to flow through the body 52 at a very reduced rate which can be best described as "weeping". A material which is suitable for body 52 of the present invention is disclosed in U.S. Pat. No. 4,517,316 and 4,616,055 to Mason. A screen 51 is located at each opening 40 above the body 52. When the compartments 36 are filled with liquid, the liquid passes through the openings 40 and then slowly drips from the body 52 at a constant reduced rate. The dispenser 10 has a pair of horizontal upper flanges 37 which enable the dispenser to be mounted to the removable top plate 14 of the grease trap by means of bolts 43.

During operation of the invention, each of the compartments 36 is filled with a solution of grease digesting or treating material, preferably, a solution which contains bacteria that is bio-engineered for digesting the grease in the trap which is being treated. In some cases, only a single compartment is required for dispensing a single treatment solution. However, in some cases, two or more treatment materials may be required for treating two or more different types of waste products which is contained in the waste water of a particular food service establishment. A dispenser having two compartments for holding two different types of treatment solution is illustrated and described in the present application as an example. In some situations, only a single compartment and a single solution is needed while in another situation, more than two compartments for holding more than two treatment solutions may be required.

The compartments 36 are refilled with treatment solution by removing the plugs 28 and filling each compartment through the treatment ports 28. If the bodies 52 become clogged or otherwise non-functional the cover 14 is removed from the trap to access the restricter 42. The body 52 can be replaced by a new body 52 or the entire restricter 42 can be replaced by a new restricter.

Referring to FIGS. 5-7, there is shown a modified restricter or metering valve which is generally indicated by the reference numeral 60 which replaces the restricter 42 at one of the openings 40. The restricter 60 includes a cup-shaped fixed portion 61 and a cup-shaped movable portion which is generally indicated by the reference numeral 63. The fixed portion 61 includes a circular vertical wall 62 which is open at the top and a bottom wall 64. The bottom wall 64 has a central upturned portion 66 which has an opening 68. The upper end of the wall 62 has internal threads which enables the fixed portion 61 to be threaded to one of the flanges 44. The movable portion 63 has a circular vertical wall 72 which is open at the top and a bottom wall 73 which is completely closed. A plurality of guide vanes 70 extend downwardly from the bottom wall 73 through the opening 68. The bottom wall 73 has a convex bottom surface 71 where the vanes 70 intersect with the bottom wall 73 for sealing the opening 68 when the movable portion 63 is in the lower or closed position shown in FIG. 5. A circular flange 75 extends downwardly from the wall 73 outside of the central upturned portion 66 for forming a water tight seal between the fixed portion 61 and the movable portion 63. A hollow float 74 is fixed to the bottom of a plug 70 and extends substantially below the plug and the bottom wall 64 of the fixed portion 61. The vertical wall 72 of the movable portion 63 is located within the opening 40 and forms a balancing bell for maintaining the plug 70 in a sealing orientation with the opening 68. When the restricter 60 is in the closed position, as shown in FIG. 5, the fluid from the compartment above the restricter is prevented from flowing through the restricter. When waste water enters the grease trap 12 from the inlet opening 18, the liquid level within the trap rises above the low water mark which is indicated by the dot-and-dash line 78 in FIG. 1. When the level of liquid in the trap reaches the float 74, the float is forced upwardly by the fluid which also causes the movable portion 63 to be raised upwardly to its open position relative to the fixed portion 61 as shown in FIG. 6. The lower ends of the vanes 70 are flared outwardly to prevent the vanes from being pushed upwardly through the opening 68 as the float 74 rises due to the rising level of fluid within the trap 12. The portions 61 and 63 are preferably made of a flexible material, such as thermoplastic which enables the vanes to be pushed through the openings 68 when the portions 61 and 63 are coupled together. When the movable portion 63 is raised to its upper open position as shown in FIG. 6, the fluid from the compartment above the opening 40 can pass between the flange 75 and the upturned portion 66 and down through the opening 68 between the vanes 70. A restrictive flow of fluid is thereby established from the compartment for application to the grease or other digestible substances which has been separated from the waste water in the chamber of the grease trap. When the level of fluid within the grease trap returns to its low level 78 the movable portion 63 returns to its closed position as shown in FIG. 5 to again seal the opening 68. The movable portion 63 remains in this closed position until the next in flow of waste water from the inlet opening 18. In this way, the treatment fluid from the compartment above the restricter 60 is metered out by the restricter 60 in accordance with usage of the grease trap.

The valve 60 may be further modified by providing a solid plug at the base of the vanes 70 which effectively seals the opening 68 when the movable portion 63 is raised to its upper position as shown in FIG. 6. This limits the flow of fluid from the storage compartment 36 through the opening 68 to the transition period between the upper and lower positions of the movable portion 63.

Clearly minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Apparatus for treating waste water which contains contaminants including grease, said apparatus comprising:
    (a) a housing which has a chamber, an inlet opening to the chamber and an outlet opening from the chamber,
    (b) means for separating grease from waste water which enters the chamber from said inlet opening so that the grease remains in the chamber as the rest of the waste water flows out of the chamber through said outlet opening, and
    (c) a dispenser which is connected to said housing and located within said chamber above said inlet and outlet openings for containing a liquid quantity of grease digesting material and for dispensing said material to the grease in said chamber at a restricted rate, said dispenser comprising:
        (1) a housing having a compartment for holding a quantity of said grease digesting material, an access opening for replenishing said compartment with said digesting material and a dispensing opening at the lower end of said compartment, and
        (2) a restricter which includes a porous material which is pervious to liquid at said dispensing opening for enabling said digesting material to pass by gravity from said dispensing opening to the grease in said chamber at a relatively slow constant restricted rate, said restricter having an inner surface which faces said dispensing opening and an outer surface which faces the grease in said chamber, and said porous material being a rubber composition which has pores that extend from said inner surface to said outer surface.

2. Apparatus for treating waste water which contains contaminants including grease, said apparatus comprising:
    (a) a housing which has a chamber, an inlet opening to the chamber and an outlet opening from the chamber,
    (b) means for separating grease from waste water which enters the chamber from said inlet opening so that the grease remains in the chamber as the rest of the waste water flows out of the chamber through said outlet opening, and
    (c) a dispenser which is connected to said housing and located within said chamber above said inlet and outlet openings for containing a liquid quantity of grease digesting material and for dispensing said material to the grease in said chamber at a restricted rate, said dispenser comprising:
        (1) a housing having a compartment for holding a quantity of said grease digesting material, an access opening for replenishing said compartment with said digesting material and dispensing opening at the lower end of said compartment, and
        (2) a metering valve at said dispensing opening which includes a stationary portion and a movable portion which is mounted for reciprocating movement relative to said stationary portion between a first position and a second position so that for each reciprocation of said movable portion a predetermined quantity of said digesting material is released into said chamber, and
        (3) a sensor which is operatively connected to the movable portion of said metering valve for sensing the influx of waste water into said chamber and for causing said movable portion to reciprocate to release a quantity of said digesting material into said chamber.

3. Apparatus for treating grease in a grease trap having a chamber, an inlet opening to the chamber, an outlet opening from the chamber and means for separating grease from grease containing waste water which flows through the chamber from the inlet opening to the outlet opening so that grease from the waste water stays in the chamber, said apparatus comprising:
    (a) a housing which is located in a fixed position in said chamber above said inlet and outlet openings and having a compartment for holding a liquid quantity of grease digesting material, an access opening for replenishing said compartment with said digesting material and a dispensing opening at the lower end of said compartment, and
    (b) a dispenser at said dispensing opening for dispensing said digesting material at a restricted rate, said dispenser including a porous material which is previous to liquid and through which said grease digesting liquid passes by gravity at a relatively slow rate, said dispenser having an inner surface which faces said dispensing opening and an outer surface which faces the grease in said chamber, said porous material being a rubber composition which has passageways that extend from said inner surface to said outer surface.

4. Apparatus for treating grease in a grease trap having a chamber, an inlet opening to the chamber, an outlet opening from the chamber and means for separating grease from grease containing waste water which flows through the chamber from the inlet opening to the outlet opening so that grease from the waste water stays in the chamber, said apparatus comprising:

(a) a housing which is located in a fixed position in said chamber above said inlet and outlet openings and having a compartment for holding a liquid quantity of grease digesting material, an access opening for replenishing said compartment with said digesting material and a dispensing opening at the lower end of said compartment, and (b) a dispenser at said dispensing opening for dispensing said digesting material at a restricted rate, said dispenser comprising:

(1) a metering valve at said dispensing opening which includes a stationary portion and a movable portion which is mounted for reciprocating movement relative to said stationary portion between a first position and a second position so that for each reciprocation of said movable portion a predetermined quantity of said digesting material is released into said chamber, and (2) a sensor which is operatively connected to the movable portion of said metering valve for sensing the influx of waste water into said chamber and causing said movable portion to reciprocate to release a quantity of digesting material into said chamber.

5. Apparatus for treating waste water which contains contaminants including grease, said apparatus comprising:

(a) a housing which has a chamber, an inlet opening to the chamber and an outlet opening from the chamber, (b) means for separating grease from waste water which enters the chamber from said inlet opening so that the grease remains in the chamber as the rest of the waste water flows out of the chamber through said outlet opening, and (c) a dispenser which is connected to said housing and located within said chamber above said inlet and outlet openings for containing a liquid quantity of grease digesting material and for dispensing said material to the grease in said chamber at a restricted rate, said dispenser comprising:

(1) a housing having a compartment for holding a quantity of said grease digesting material, an access opening for replenishing said compartment with said digesting material and a dispensing opening at the lower end of said compartment, and (2) a restricter at said dispensing opening for enabling said digesting material to pass from said dispensing opening to the grease in said chamber at a constant restricted rate, said restricter including a porous material which is pervious to liquid and through which said liquid digesting material passes by gravity at a relatively slow constant rate.

6. Apparatus for treating waste water as recited in claim 5, wherein said restricter is removably attached to the housing of said dispenser.

7. Apparatus for treating grease in a grease trap having a chamber, an inlet opening to the chamber, an outlet opening from the chamber and means for separating grease from grease containing waste water which flows through the chamber from the inlet opening to the outlet opening so that grease from the waste water stays in the chamber, said apparatus comprising:

(a) a housing which is located in a fixed position in said chamber above said inlet and outlet openings and having a compartment for holding a liquid quantity of grease digesting material, an access opening for replenishing said compartment with said digesting material and a dispensing opening at the lower end of said compartment, and (b) a dispenser at said dispensing opening for dispensing said digesting material at a restricted rate, said dispenser including a porous material which is pervious to liquid and through which said digesting liquid passes by gravity at a relatively slow rate.

8. Apparatus for treating grease trap as recited in claim 7, wherein said dispenser is removably attached to said housing.

* * * * *